United States Patent
Saito et al.

(10) Patent No.: US 11,945,947 B2
(45) Date of Patent: Apr. 2, 2024

(54) RECYCLABLE CROSSLINKED POLYMERIC COMPOSITIONS

(71) Applicant: UT-Battelle, LLC, Oak Ridge, TN (US)

(72) Inventors: Tomonori Saito, Knoxville, TN (US); Zhengping Zhou, Westford, MA (US); Md Anisur Rahman, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/138,277

(22) Filed: Apr. 24, 2023

(65) Prior Publication Data

US 2023/0340260 A1 Oct. 26, 2023

Related U.S. Application Data

(60) Provisional application No. 63/334,261, filed on Apr. 25, 2022.

(51) Int. Cl.
| | |
|---|---|
| *C08L 75/02* | (2006.01) |
| *C08G 18/38* | (2006.01) |
| *C08G 18/58* | (2006.01) |
| *C08G 18/73* | (2006.01) |
| *C08G 18/80* | (2006.01) |
| *C08K 3/04* | (2006.01) |

(52) U.S. Cl.
CPC ......... *C08L 75/02* (2013.01); *C08G 18/3857* (2013.01); *C08G 18/3863* (2013.01); *C08G 18/58* (2013.01); *C08G 18/73* (2013.01); *C08G 18/8054* (2013.01); *C08K 3/04* (2013.01); *C08L 2201/06* (2013.01); *C08L 2312/00* (2013.01)

(58) Field of Classification Search
CPC .. C08L 75/02; C08L 2201/06; C08L 2312/00; C08K 3/04; C08G 18/3857; C08G 18/3863; C08G 18/58; C08G 18/73; C08G 18/8054

See application file for complete search history.

(56) References Cited

U.S. PATENT DOCUMENTS

| | | |
|---|---|---|
| 9,346,931 B2 | 5/2016 | Odriozola et al. |
| 2017/0166717 A1 | 6/2017 | Odriozola et al. |
| 2017/0291982 A1 | 10/2017 | Odriozola et al. |
| 2023/0147086 A1 | 5/2023 | Saito et al. |

FOREIGN PATENT DOCUMENTS

EP 3388462 A1 * 10/2018

OTHER PUBLICATIONS

Kamble, M., et al., "Reversing fatigue in carbon-fiber reinforced vitrimer composites", Carbon (2022), Received in revised form Oct. 27, 2021, Accepted Oct. 29, 2021, Available online Nov. 2, 2021 pp. 108-114, 187.
Ma, X., "Closed-Loop Recycling of Both Resin and Fiber from High-Performance Thermoset Epoxy/Carbon Fiber Composites", ACS Macro Letters 2021, Accepted: Aug. 12, 2021, Published: Aug. 28, 2021 pp. 1113-1118, 10.
Ruiz De Luzuriaga, A., et al., "Epoxy resin with exchangeable disulfide crosslinks to obtain reprocessable, repairable and recyclable fiber-reinforced thermoset composites", Materials Horizons 2016, Accepted Mar. 7, 2016, pp. 241-247, 3.
Zhou, Z., et al., "Unraveling a path for multi-cycle recycling of tailored fiber-reinforced vitrimer composites", Cell Reports Physical Science, Sep. 21, 2022, 30 pages, 3, 101036.

* cited by examiner

*Primary Examiner* — Rabon A Sergent
(74) *Attorney, Agent, or Firm* — Scully, Scott, Murphy & Presser, P.C.

(57) ABSTRACT

A crosslinked polymeric composition comprising A, B, C, D, and E units having the following structures, respectively:

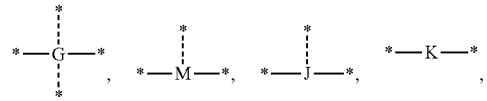

and

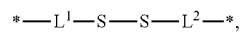

wherein dashed bonds represent optional bonds; the asterisks (*) in C units represent covalent bond connection points with asterisks in A units and E units; the asterisks (*) in D units represent covalent bond connection points with asterisks in B units and E units; wherein a portion of E units are bound to C units, a portion of E units are bound to D units, and a portion of E units are bound to both C and D units; and the composition contains a multiplicity of A, B, C, D, and E units. Also described is a method for producing the crosslinked polymeric composition by reacting epoxy-containing molecules (A molecules), isocyanate-containing molecules (B molecules), and disulfide-containing molecules (C molecules).

26 Claims, 4 Drawing Sheets

RECYCLABLE CROSSLINKED POLYMERIC COMPOSITIONS

CROSS REFERENCE TO RELATED APPLICATION

The present application claims benefit of U.S. Provisional Application No. 63/334,261, filed on Apr. 25, 2022, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to crosslinked polymeric compositions that can be reprocessed and recycled by virtue of dynamic crosslinks present in the polymer compositions. The present invention more particularly relates to such crosslinked polymeric compositions containing dynamic disulfide linkages as the dynamic crosslinks. The present invention also relates to composites containing the crosslinked polymeric composition and one or more particulate fillers, such as carbon fiber, glass fiber, basalt fiber, or cellulose fiber.

BACKGROUND

As plastic waste continues to rapidly accumulate, methods for recycling of plastics and achieving carbon neutrality have become ever more urgent. In efforts for reducing plastic waste, circular manufacturing of new recyclable polymers has become a primary goal. Processes that could render currently non-recyclable polymers recyclable and produce and use them within a circular (closed loop) cycle would significantly reduce global plastic waste compared to the traditional manufacturing and use of polymers. However, such processes have remained largely elusive.

Carbon fiber-reinforced polymers (CFRPs), in particular, are being increasingly used in automobiles, wind power conversion, and aerospace applications, because of their lightweight and robust mechanical properties. Because of this, the global demand for carbon fiber is continuously growing. However, the rapid growth of CFRPs adoption in various industries generates major environmental challenges in waste management. Most of the conventional CFRPs are very difficult to recycle, and ultimately end up in the natural environment or a landfill because their resins are permanently crosslinked. The permanent (static) crosslinking prevents remolding, repairing, or recycling.

Moreover, carbon fiber (CF) production is energy-intensive (~198-595 MJ/kg) and results in the emission of significant amounts of carbon dioxide. Recycling CFs and CFRPs will significantly save energy consumption and reduce the carbon footprint. For example, the successful chemical recycling of CFRPs was estimated to yield only 38.4 MJ/kg, 10-20% of the total energy consumption from pure CF production (Zhang et al., *Compos. B. Eng.* 193, 108053. https://doi.org/10.1016/j.compositesb.2020.108053). While advances have been made for recycling of CFRPs, conventional recycling technologies are energy-intensive and the mechanical properties of the reprocessed material are typically much lower compared to the original product. As a consequence, recycling rates remain very low, and the poor recyclability of CFRPs is the major bottleneck for wider adoption of lightweight materials in contrast to traditional metals like steels with established recycling paths (L. T. Korley et al., *Science,* 373, 66-69).

Vitrimer polymers (i.e., vitrimers) have the potential to be recyclable, and may thus be capable of being produced and used in a circular system. However, current vitrimers do not have the combination of properties needed for many industrial applications, particularly those in which the material needs to be tough and resilient. An ideal vitrimer for industrial applications needs the characteristics of (1) high mechanical strength and toughness, (2) facile processability (e.g., low temperature and short annealing time), and (3) mechanical or chemical recyclability. However, currently known vitrimers are generally incapable of meeting all these characteristics. Therefore, new strategies are needed to tailor malleable thermosets to maintain their robust mechanical properties while simultaneously promoting reprocessability and recyclability to realize their circular use in high-performance CFRPs.

SUMMARY

In one aspect, the present disclosure is directed to crosslinked polymeric compositions that are amenable to recycling and reprocessing by virtue of disulfide dynamic covalent bonds incorporated into their structures. The crosslinked polymeric compositions described herein can advantageously be mixed with carbon fiber or other filler material to produce carbon fiber-reinforced polymers (CFRPs) that are recyclable and reprocessable.

The crosslinked polymeric compositions also advantageously possess high mechanical strength and toughness.

The crosslinked polymeric compositions described herein are constructed of at least (or precisely) A, B, C, D, and E units, wherein the foregoing units are defined and interconnected with each other as follows:

A units:

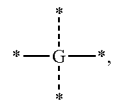

wherein G is a hydrocarbon linker;

B units:

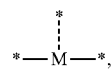

wherein M is a hydrocarbon linker;

C units:

wherein J is a linkage resulting from reaction between an epoxy group and a group reactive with an epoxy group;

D units:

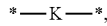

wherein K is a linkage resulting from reaction between an isocyanate group and a group reactive with an isocyanate group; and E units:

wherein $L^1$ and $L^2$ are independently hydrocarbon linkers; wherein: dashed bonds represent optional bonds; the asterisks (*) in C units represent covalent bond connection points with asterisks in A units and E units; the asterisks (*) in D units represent covalent bond connection points with asterisks in B units and E units; wherein a portion of E units are bound to only C units, a portion of E units are bound to only D units, and a portion of E units are bound to both C and D units; and the composition contains a multiplicity of A units, multiplicity of B units, multiplicity of C units, multiplicity of D units, and multiplicity of E units.

In another aspect, the present disclosure is directed to methods of producing crosslinked polymeric compositions, as described above, by reacting at least (or precisely) A, B, and C molecules to result in dynamic covalent interconnections between the molecules. The A, B, and C molecules and the method of reacting them are provided as follows:

A molecules:

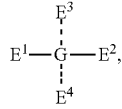

wherein G is a hydrocarbon linkage connected to at least $E^1$ and $E^2$ and optionally to one or both of $E^3$ and $E^4$, if present, wherein $E^1$, $E^2$, $E^3$, and $E^4$ are epoxy groups;

B molecules:

wherein M is a hydrocarbon linkage connected to at least $I^1$ and $I^2$ and optionally $I^3$, if present, wherein $I^1$, $I^2$ and $I^3$ represent isocyanate groups; and C molecules:

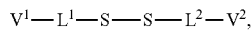

wherein $L^1$ and $L^2$ are independently hydrocarbon linkers, and $V^1$ and $V^2$ are independently functional groups reactive with epoxy groups ($E^1$, $E^2$, $E^3$, and $E^4$ groups) and isocyanate groups ($I^1$, $I^2$, and $I^3$ groups);

wherein:
dashed bonds represent optional bonds;
$V^1$ and $V^2$ react with $E^1$ and $E^2$, and optionally $E^3$ and/or $E^4$, if present, to produce first linking units having the formula:

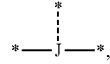

wherein J is a linkage resulting from reaction between an epoxy group, selected from $E^1$, $E^2$, $E^3$, and $E^4$ groups, and a group reactive with an epoxy group, selected from $V^1$ and $V^2$ groups, to result in the first linking units covalently bonding between G hydrocarbon linkages of A molecules and $L^1$ and $L^2$ of C molecules; and $V^1$ and $V^2$ react with $I^1$ and $I^2$, and optionally $I^3$, if present, to produce second linking units having the formula:

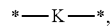

wherein K is a linkage resulting from reaction between an isocyanate group, selected from $I^1$, $I^2$, and $I^3$ groups, and a group reactive with an isocyanate group, selected from $V^1$ and $V^2$ groups, to result in the second linking units covalently bonding between M hydrocarbon linkages of B molecules and $L^1$ and $L^2$ of C molecules.

BRIEF DESCRIPTION OF THE FIGURES

FIG. 1A shows a conventional epoxy based on permanently crosslinked networks that cannot be reprocessed or recycled after cure. FIG. 1B shows a dynamic epoxy (DE) containing dynamic covalent bonds as part of the crosslinked network that can be reprocessed or recycled only at high temperatures and a long annealing time (lacks repeated recyclability). FIG. 1C shows a dynamic polyurea/epoxy (DPE) with exchangeable bonds that has a controllable network reconfiguration and possesses a relatively low glass transition temperature. After curing, the DPE can be reprocessed or recycled (at least six times) at moderate temperature and short annealing time.

FIG. 2A is a schematic showing synthesis of crosslinked DPE resin by reacting isocyanate and epoxy with 4-aminophenyl disulfide (AFD). FIGS. 2B and 2C are DMA curves obtained for different weight ratios of polyurea to epoxy, representing storage modulus (FIG. 2B) and tan δ versus temperature (FIG. 2C). FIG. 2D shows representative tensile stress-strain curves for three different weight ratios of polyurea to epoxy resins, including 0:1, 1:2, 1:1, 1:0, and 2:1. FIG. 2E charts average tensile strength and strain values from the tensile stress-strain curves. Data are represented as mean±SEM.

FIG. 3A is a normalized relaxation modulus of $G/G^0$ curves of the DE and the DPE (weight ratio=1:1) networks at 160° C. FIG. 3B is a fitting of the relaxation times of the DE and the DPE networks to the Arrhenius' equation ($R^2$=0.997 and 0.953, respectively) at different temperatures. FIG. 3C shows traditional epoxy samples crosslinked by unexchangeable bonds processed in a hot press at 200° C. and 500 psi for 5 min, resulting in broken pieces. FIG. 3D shows tested DE specimens reprocessed at the same hot-pressing condition as traditional epoxy, forming a compact film. FIG. 3E shows pristine DPE samples (left after testing) hot-pressed (reprocessed) at 160° C. and 100 psi for 1 min to obtain a recycled compact film. The DPE film was easily cut to dumbbell-shaped specimens. FIG. 3F shows tensile strength values of reprocessed DE and polyurea/epoxy samples. Data are represented as mean±SEM. FIG. 3G shows Fourier transform infrared spectroscopy (FTIR) spectra of dynamic samples before and after reprocessing.

FIG. 4A shows three individual carbon fiber fabric composite sheets with the DPE (weight ratio=1:1) and after being hot-pressed at 160° C. for 1 min to obtain a compact multilayered thermoformed composite sheet. The multilayered composite sheet is reshaped to a 3D shape after the compression molding process. The far right image shows the top and bottom views of the multilayered 3D composite sheet. FIG. 4B shows representative stress-strain curves obtained from the tensile tests for conventional epoxy composites, DE composites, and DPE composites, respectively. FIG. 4C shows a DPE composite with a crack in the middle of the sample after the flexural test. After being hot-pressed at 160° C. for 5 min, the crack in the sample disappeared and the matrix was fully repaired. FIGS. 4D and 4E compare DE and DPE samples in flexural strength (FIG. 4D) and interlaminar shear strength (FIG. 4E). Data are represented as mean±SEM.

DETAILED DESCRIPTION

Figures 1A, 1B, 1C:
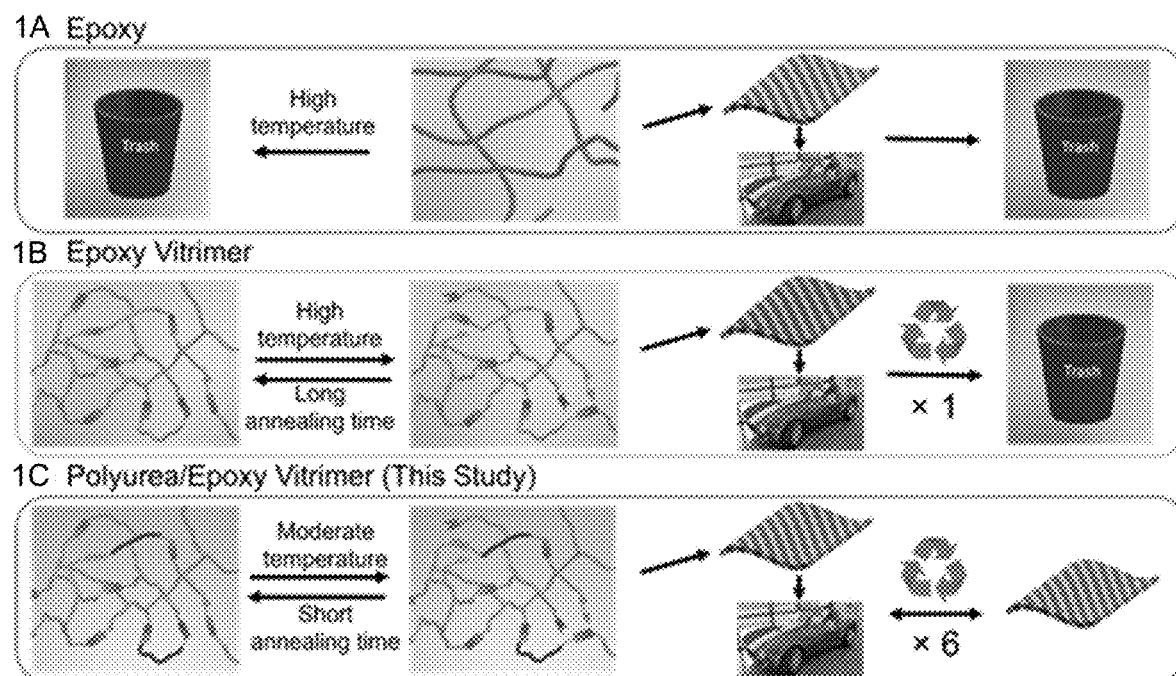
FIGS. 1A-1C. Schematic illustration of traditional thermoset and dynamic vitrimers.

In a first aspect, the present disclosure is directed to crosslinked polymeric compositions containing disulfide dynamic covalent bonds. By virtue of the disulfide dynamic covalent bonds, the crosslinked polymeric compositions can be reprocessed and recycled. The crosslinked polymeric compositions are constructed of at least (or exclusively contain) A, B, C, D, and E units interconnected with each other, wherein the foregoing units are defined below.

The A units have the following structure:

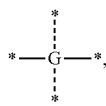

wherein G is a hydrocarbon linker and wherein the dashed bonds represent optional bonds. G corresponds to the portion of a di-epoxy, tri-epoxy, or tetra-epoxy molecule which links the corresponding two, three, or four epoxy groups, respectively. Thus, G represents only the hydrocarbon linking portion of an epoxy-containing molecule and does not include the epoxy groups or reaction products thereof. As further discussed later on below, each linkage J (in C units) represents the reaction product between an epoxy group and a group reactive with an epoxy group (as found in E units), and the J linkages connect between A units and E units.

The B units have the following structure:

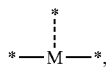

represents an optional bond. M corresponds to the portion of a diisocyanate or triisocyanate molecule which links the corresponding two or three isocyanate groups, respectively. Thus, M represents only the hydrocarbon linking portion of an isocyanate-containing molecule and does not include the isocyanate groups or reaction products thereof. As further discussed later on below, each linkage K (in D units) represents the reaction product between an isocyanate group and a group reactive with an isocyanate group (as found in E units), and the K linkages connect between B units and E units.

The G and M hydrocarbon linkers found in A units and B units, respectively, may independently contain 1-12 carbon atoms, or they may contain a substantially higher number of carbon atoms, e.g., at least or above 7, 8, 9, 10, 11, 12, 15, 18, 24, or 30, and even polymeric groups. One or more of the hydrocarbon linkers disclosed herein may independently possess any range of carbon atoms bounded by any two of the foregoing values, e.g., 1-30, 1-24, 1-18, 1-12, 1-8, 1-6, 2-30, 2-24, 2-18, 2-12, 2-8, 2-6, 3-30, 3-24, 3-18, 3-12, 3-8, or 3-6 carbon atoms. In different embodiments, G is a hydrocarbon linking group (or more particularly, an alkylene or aromatic-containing linking group) containing 1, 2, 3, 4, 5, 6, 7, 8, 9, 10, 11, or 12 carbon atoms or a number of carbon atoms within a range bounded by any two of the foregoing values. Independent of G, in different embodiments, M is a hydrocarbon linking group (or more particularly, linear or branched alkyl or alkenyl linking group, or an aromatic-containing linking group) containing 1, 2, 3, 4, 5, 6, 7, 8, 9, 10, 11, or 12 carbon atoms or a number of carbon atoms within a range bounded by any two of the foregoing values. The G and M hydrocarbon linkers may also correspond to definitions of these linkers in A and B molecules described later on below in this disclosure.

In some embodiments, one or both of G and M is/are independently selected from linear or branched alkyl or alkenyl linking groups or aliphatic or aromatic cyclic linking groups. In some embodiments, one or both of G and M is/are independently selected from alkylene linking groups of the formula —$(CH_2)_n$—, wherein n is independently an integer of 1-30, 1-20, 1-18, 1-12, 2-12, 3-12, or 4-12, and one or more H atoms in the foregoing formula may (or may not) be substituted by a methyl or ethyl group. In some embodiments, one or both of G and M is/are independently selected from aromatic-containing or fully aromatic linking groups, wherein the term "aromatic" may include carbocyclic and/or heterocyclic linking rings. Some examples of carbocyclic aromatic linkers include phenylene and naphthyl linkers. Some example of heterocyclic aromatic (i.e., heteroaromatic) linkers include pyridinyl and thienyl linkers. In some embodiments, G (in A units) and/or M (in B units) contains at least one aromatic ring. In some embodiments, G (in A units) and/or M (in A units) contains at least two aromatic rings, which may be directly connected to each other or interconnected by an alkylene linkage.

In particular embodiments, the A units (i.e., G linkers) have the following structure:

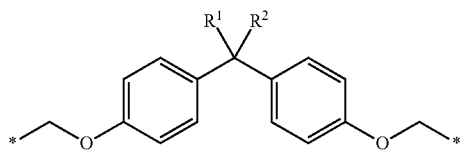

wherein $R^1$ and $R^2$ are independently selected from H and $CH_3$ groups. In some embodiments, $R^1$ and $R^2$ are both H, or one or both of $R^1$ and $R^2$ is/are methyl.

In particular embodiments, the B units (i.e., M linkers) have the following structure: —(CH$_2$)$_n$—, wherein n is independently an integer of 1-30, 1-20, 1-18, 1-12, 2-12, 3-12, or 4-12, and one or more H atoms in the foregoing formula may (or may not) be substituted by a methyl or ethyl group. In some embodiments, the B units have the foregoing alkylene structure in combination with A units having an aromatic-containing structure.

The C units have the following structure:

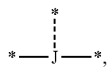

wherein J is a linkage resulting from reaction between an epoxy group and a group reactive with an epoxy group. The asterisks (*) in C units represent covalent bond connection points with asterisks in A units and E units. In some embodiments, the group reactive with an epoxy group is selected from an amino, hydroxy, or carboxylic acid group. Thus, in some embodiments, J is a linkage resulting from reaction between an epoxy group and an amino, hydroxy, or carboxylic acid group.

In some embodiments, the C units (i.e., J linkages) have the following structure:

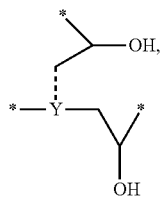

wherein Y is selected from

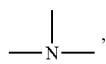

—NH—, —O—, and —C(O)O—; and the dashed bond represents an optional bond that can only be present when Y is

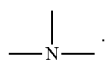

The D units have the following structure:

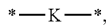

wherein K is a linkage resulting from reaction between an isocyanate group and a group reactive with an isocyanate group. The asterisks (*) in D units represent covalent bond connection points with asterisks in B units and E units. In some embodiments, the group reactive with an isocyanate group is selected from an amino, hydroxy, or carboxylic acid group. Thus, in some embodiments, K is a linkage resulting from reaction between an isocyanate group and an amino, hydroxy, or carboxylic acid group.

In some embodiments, the D units (K linkages) have the following structure:

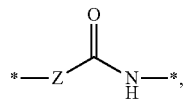

wherein Z is —NH—, —O—, or a bond.

The E units have the following structure:

L$^1$ and L$^2$ may independently possess any range of carbon atoms, e.g., 1-30, 1-24, 1-18, 1-12, 1-8, 1-6, 2-30, 2-24, 2-18, 2-12, 2-8, 2-6, 3-30, 3-24, 3-18, 3-12, 3-8, or 3-6 carbon atoms. In different embodiments, L$^1$ and L$^2$ are independently selected from aromatic-containing linking groups (e.g., phenylene or as enumerated earlier above) containing at least or precisely 6, 7, 8, 9, 10, 11, or 12 carbon atoms or a number of carbon atoms within a range bounded by any two of the foregoing values. In other embodiments, L$^1$ and L$^2$ are independently selected from linear or branched alkyl or alkenyl linking groups containing 1, 2, 3, 4, 5, 6, 7, 8, 9, 10, 11, or 12 carbon atoms or a number of carbon atoms within a range bounded by any two of the foregoing values.

The crosslinked polymeric composition described above contains a multiplicity of A units, multiplicity of B units, multiplicity of C units, multiplicity of D units, and multiplicity of E units. The term "multiplicity" as used herein, generally indicates at least or more than 5, 10, 15, 20, 30, 40, 50, or 100 units, which may be independently selected for each of the A, B, C, D, and E units. In the crosslinked polymeric composition, a portion of E units are bound to C units via both L$^1$ and L$^2$ of the E units (wherein the C units are further bound to A units), a portion of E units are bound to D units via both L$^1$ and L$^2$ of the E units (wherein the D units are further bound to B units), and a portion of E units are bound to both C and D units (i.e., one of L$^1$ or L$^2$ is bound to C units, and the other of L$^1$ or L$^2$ is bound to D units, wherein C and D units are further bound to A units and B units, respectively).

In some embodiments, the crosslinked polymeric composition further includes a solid filler material homogeneously distributed throughout the crosslinked polymeric composition. The filler material is typically included to favorably modify the physical properties (e.g., tensile strength, modulus, and/or elongation) of the crosslinked polymeric composition. Some of these modifying agents include, for example, carbon particles, silicon-containing particles (e.g., glass, silica, or silicate particles), basalt particles, polymeric (e.g., cellulose) particles, metal oxide particles, and metallic particles. The term "particles," as used herein, refers to discrete units of a solid material, wherein the particles may have any shape, including spherical, polyhedral, plate-like, or a fibrous shape. The particles typically contain at least one or two of their dimensions in the nanometer or micron size range, e.g., 1 nm, 10 nm, 50 nm, 100 nm, 500 nm, 1 micron, 5 microns, 10 microns, 50 microns, or 100 microns, or a size within a range bounded by any two of the foregoing sizes. In particular embodiments, the solid material is a solid fiber, wherein the term "fiber" refers to a particle shape which has a length dimension substantially longer (typically at least 10, 20, 50, or 100 times) than a width dimension.

Carbon particles (or more specifically, fibers), if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 m, and up to 20, 50, 100, 200, or 500 m), or macroparticles (e.g., above 500 m, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

In some embodiments, the carbon particles (or fibers) are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be nanoscopic, microscopic, or macroscopic segments of any of the high strength continuous carbon fiber compositions known in the art. Some examples of carbon fiber compositions include those produced by the pyrolysis of polyacrylonitrile (PAN), viscose, rayon, pitch, lignin, and polyolefins, any of which may or may not be heteroatom-doped, such as with nitrogen, boron, oxygen, sulfur, or phosphorus. The carbon fiber may alternatively be vapor grown carbon nanofibers. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the composition.

In some embodiments, the filler material has an inorganic composition, such as a metal oxide or metal sulfide composition. The term "metal", as used herein, can refer to any element selected from main group, alkali, alkaline earth, transition metal, and lanthanide elements. Thus, the metal oxide or metal sulfide may be a main group metal oxide or sulfide, alkali metal oxide or sulfide, alkaline earth metal oxide or sulfide, transition metal oxide or sulfide, or lanthanide metal oxide or sulfide. Some examples of main group metal oxide compositions include $SiO_2$ (i.e., silica, e.g., glass or ceramic), $B_2O_3$, $Al_2O_3$(alumina), $Ga_2O_3$, SnO, $SnO_2$, PbO, $PbO_2$, $Sb_2O_3$, $Sb_2O_5$, and $Bi_2O_3$. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of transition metal oxide compositions include $Sc_2O_3$, $TiO_2$ (titania), $Cr_2O_3$, $Fe_2O_3$, $Fe_3O_4$, FeO, $CO_2O_3$, $Ni_2O_3$, CuO, $Cu_2O$, ZnO, $Y_2O_3$(yttria), $ZrO_2$ (zirconia), $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O_3$, and $CeO_2$. Analogous metal sulfide compositions can be derived by substitution of oxide (O) with sulfide (S) in any of the exemplary metal oxide compositions recited above (e.g., $SiS_2$, $Li_2S$, or CaS). In some embodiments, any one or more of the above described inorganic compositions are excluded.

In another set of embodiments, the filler material has an organic composition. The organic composition may be, for example, a natural or synthetic polymer. Some examples of natural polymers (biopolymers) include cellulose (e.g., cellulose fiber), hemicellulose, chitin, and chitosan. Some examples of synthetic polymers include polyvinylalcohol (PVA), polyvinylacetate, polyvinypyrrolidinone, polyacrylamide, polyethylene (PE), polypropylene (PP), polystyrene (PS), polysiloxanes, polyamides, polyesters (e.g., PLA and/or PGA), and copolymers thereof. In some embodiments, any one or more of the above described organic compositions are excluded.

The filler material is typically present in an amount of at least 0.1 wt % of the crosslinked polymeric composition. In different embodiments, the filler material is present in an amount of precisely or about, for example, 0.1, 0.2, 0.5, 1, 2, 3, 4, 5, 10, 15, 20, 25, 30, 40, 45, 50, 55, 60, 65, 70, 75, 80, 85, 90 wt %, or an amount within a range bounded by any two of the foregoing values (e.g., 0.1-90 wt %, 0.1-80 wt %, 0.1-70 wt %, 0.1-60 wt %, 0.1-50 wt %, 0.1-40 wt %, 0.1-30 wt %, 0.1-20 wt %, 0.1-10 wt %, 0.1-5 wt %, 1-90 wt %, 1-80 wt %, 1-70 wt %, 1-60 wt %, 1-50 wt %, 1-40 wt %, 1-30 wt %, 1-20 wt %, 1-10 wt %, or 1-5 wt %).

Any of the filler materials described above, which may have any of the inorganic or organic compositions described above, may be present in the crosslinked polymeric composition in any of the amounts provided above, or subranges therein, and may, in addition, have any of the particle shapes and sizes or sub-ranges thereof, as also described above.

In another aspect, the present disclosure is directed to a method of producing the crosslinked polymer compositions described above. The method involves reacting A molecules (epoxy-containing molecules), B molecules (isocyanate-containing molecules), and C molecules (disulfide molecules with groups reactive with epoxy and isocyanate groups) under conditions where C molecules crosslink with A molecules and B molecules, as further discussed below.

The A molecules have the following structure:

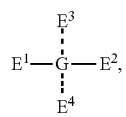

wherein G is a hydrocarbon linker, as described above, and $E^1$, $E^2$, $E^3$, and $E^4$ are epoxy groups. The dashed bonds represent optional bonds. G is connected to at least $E^1$ and $E^2$ and optionally to one or both of $E^3$ and $E^4$, if present. G corresponds to the portion of the A molecule (which may be a di-epoxy, tri-epoxy, or tetra-epoxy molecule) that links the corresponding two, three, or four epoxy groups, respectively. G may have any number of carbon atoms, as described earlier above, and may be selected from any type of hydrocarbon linking group, e.g., linear or branched alkyl or alkenyl, or aromatic hydrocarbon linking groups, as described earlier above. In some embodiments, the A molecules have the formula $E^1\text{-}(CH_2)_v\text{-}E^2$, wherein v is an integer of precisely, at least, or about 1, 2, 3, 4, 5, 6, 7, 8, 9, 10, 11, or 12 (or range therein) and wherein one or more of the H atoms may be substituted with a methyl, ethyl, n-propyl, or isopropyl group.

In particular embodiments, G (in A molecules) contains at least one aromatic ring. In further embodiments, G (in A molecules) contains at least or precisely two aromatic rings which may or may not be interconnected by an alkylene linkage. In further specific embodiments, the A molecules have the following structure:

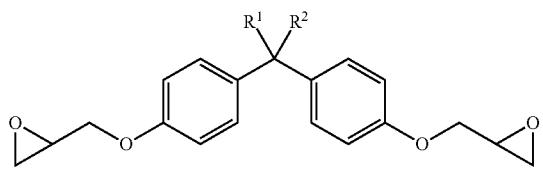

wherein $R^1$ and $R^2$ are independently selected from H and $CH_3$ groups. In some embodiments, $R^1$ and $R^2$ are both H. In other embodiments, $R^1$ and $R^2$ are both $CH_3$. In other embodiments, $R_1$ is H and $R_2$ is $CH_3$.

The B molecules have the following structure:

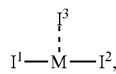

wherein M is a hydrocarbon linker, as described above, and $I^1$, $I^2$ and $I^3$ represent isocyanate groups. The dashed bond represents an optional bond. M is connected to at least $I^1$ and $I^2$ and optionally $I^3$, if present. M corresponds to the portion of the B molecule (which may be a diisocyanate or triisocyanate molecule) that links the corresponding two or three isocyanate groups, respectively. M may have any number of carbon atoms, as described earlier above, and may be selected from any type of hydrocarbon linking group, e.g., linear or branched alkyl or alkenyl, or aromatic hydrocarbon linking groups, as described earlier above.

In particular embodiments, M (in B molecules) is an alkylene linker of the formula $(CH_2)_n$, wherein n is an integer in a range of 1-12. In different embodiments, n is 1, 2, 3, 4, 5, 6, 7, 8, 9, 10, 11, or 12, or a number within a range bounded by any two of the foregoing numbers, e.g., 1-12, 2-12, 3-12, 4-12, 5-12, 6-12, 1-8, 2-8, 3-8, 4-8, 5-8, or 6-8. In other embodiments, M contains at least one aromatic ring. In further embodiments, M contains at least or precisely two aromatic rings which may or may not be interconnected by an alkylene linkage.

In specific embodiments, the B molecules have the following structure:

wherein m is an integer in a range of 0-10. In different embodiments, m is 0, 1, 2, 3, 4, 5, 6, 7, 8, 9, or 10 or a number within a range bounded by any two of the foregoing, e.g., 0-10, 1-10, 2-10, 3-10, 4-10, 5-10, 6-10, 8-10, 0-8, 1-8, 2-8, 3-8, 4-8, 5-8, or 6-8.

The C molecules have the following structure:

wherein $L^1$ and $L^2$ are independently hydrocarbon linkers, as described above, and $V^1$ and $V^2$ are independently functional groups reactive with epoxy groups ($E^1$, $E^2$, $E^3$, and $E^4$ groups) and isocyanate groups ($I^1$, 2, and $I^3$ groups). $L^1$ and $L^2$ may independently possess any range of carbon atoms, e.g., 1-30, 1-24, 1-18, 1-12, 1-8, 1-6, 2-30, 2-24, 2-18, 2-12, 2-8, 2-6, 3-30, 3-24, 3-18, 3-12, 3-8, or 3-6 carbon atoms. In different embodiments, $L^1$ and $L^2$ are independently selected from aromatic-containing linking groups (e.g., phenylene or as enumerated earlier above) containing at least or precisely 6, 7, 8, 9, 10, 11, or 12 carbon atoms or a number of carbon atoms within a range bounded by any two of the foregoing values. In other embodiments, $L^1$ and $L^2$ are independently selected from linear or branched alkyl or alkenyl linking groups containing 1, 2, 3, 4, 5, 6, 7, 8, 9, 10, 11, or 12 carbon atoms or a number of carbon atoms within a range bounded by any two of the foregoing values.

As noted above, $V^1$ and $V^2$ are independently functional groups reactive with epoxy groups ($E^1$, $E^2$, $E^3$, and $E^4$ groups) and isocyanate groups ($I^1$, 2, and $I^3$ groups). In particular embodiments, $V^1$ and $V^2$ are independently selected from amino, hydroxy, and carboxylic acid (or ester) groups.

$V^1$ and $V^2$ react with $E^1$ and $E^2$, and optionally $E^3$ and/or $E^4$, if present, to produce first linking units having the formula:

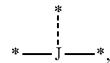

wherein J is a linkage resulting from reaction between an epoxy group, selected from $E^1$, $E^2$, $E^3$, and $E^4$ groups, and a group reactive with an epoxy group, selected from $V^1$ and $V^2$ groups, to result in the first linking units covalently bonding between G hydrocarbon linkages of A molecules and $L^1$ and $L^2$ of C molecules. The dashed line represents an optional bond, which may be present when J includes a nitrogen atom as the linking point. Each linkage J (in C units) represents the reaction product between an epoxy group and a group reactive with an epoxy group (as found in E units), and the J linkages connect between A units and E units, as described earlier above.

In particular embodiments, the first linking units have the structure:

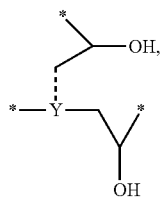

wherein Y is selected from

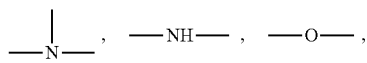

and —C(O)O—; and the dashed bond represents an optional bond that can only be present when Y is

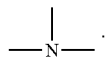

$V^1$ and $V^2$ react with $I^1$ and $I^2$, and optionally $I^3$, if present, to produce second linking units having the formula:

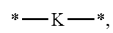

wherein K is a linkage resulting from reaction between an isocyanate group, selected from $I^1$, 2, and $I^3$ groups, and a group reactive with an isocyanate group, selected from $V^1$ and $V^2$ groups, to result in the second linking units covalently bonding between M hydrocarbon linkages of B molecules and $L^1$ and $L^2$ of C molecules. Each linkage K (in D units) represents the reaction product between an isocyanate group and a group reactive with an isocyanate group (as found in E units), and the K linkages connect between B units and E units, as described earlier above.

In particular embodiments, the second linking units have the structure:

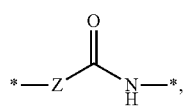

wherein Z is —NH—, —O—, or a bond.

In the method, any suitable molar ratio between A molecules (epoxy) and B molecules (isocyanate) can be used. The molar ratio of A molecules to B molecules may be, for example, precisely or about 3:1, 2:1, 1:1, 1:2, or 1:3, or a molar ratio within a range bounded by any two of the foregoing ratios (e.g., 3:1-1:3 or 2:1-1:2). Any suitable molar ratio between A molecules (epoxy) and C molecules (disulfide) may also be used. The molar ratio of A molecules to C molecules may be, for example, precisely or about 3:1, 2:1, 1:1, 1:2, or 1:3, or a molar ratio within a range bounded by any two of the foregoing ratios (e.g., 3:1-1:3 or 2:1-1:2). The molar ratio of B molecules to C molecules may be, for example, precisely or about 3:1, 2:1, 1:1, 1:2, or 1:3, or a molar ratio within a range bounded by any two of the foregoing ratios (e.g., 3:1-1:3 or 2:1-1:2).

In typical embodiments, A molecules, B molecules, and C molecules are combined and mixed into a solvent (e.g., an ether, such as THF) in which they are soluble. Once combined in the solvent, the A, B, and C molecules may be cured by stirring the mixture or letting the mixture stand at room temperature (typically 18-30° C. or about 25° C.) or at an elevated temperature (e.g., precisely or about 40, 50, 60, 70, 80, 90, 100, 110, or 120° C.) from a period of time of, for example, 0.5, 1, 2, 3, 4, 5, or 6 hours.

The present disclosure is also directed to a method of recycling the crosslinked polymeric composition or a filler-reinforced composite thereof. By a first method, the crosslinked polymeric composition or filler-reinforced composite is mechanically broken down and subjected to thermal pressing for mechanical recycling. By a second method, the crosslinked polymeric composition or filler-reinforced composite is contacted with a solvent containing a thiol (SH) group, such as 1-dodecanethiol (DDT), to permit the solvent to dissolve the crosslinked polymeric composition, thereby leaving any filler, if present, which can be recovered in the absence of the crosslinked polymeric composition. The dissolved crosslinked polymeric composition, in turn, can be recovered by, for example, evaporation of the solvent, or by addition of another solvent which dissolves the thiol solvent but precipitates the polymer.

In some embodiments, thermal pressing is used to repair a defect in the crosslinked polymeric composition or filler-reinforced composite. The defect may be, for example, a crack, separation, or uneven portion. The crosslinked polymeric composition or filler-reinforced composite containing the defect may be subjected to thermal pressing to repair the defect. The thermal pressing process may employ a temperature of, for example, 90° C., 100° C., 110° C., 120° C., 130° C., 140° C., 150° C., 160° C., 170° C., 180° C., 190° C., or 200° C. for a period of time of 0.5, 1, 2, 5, 7, 10, 15, 20 or 30 minutes in a compression mold or a heat press, such as used in ironing. Notably, the repaired crosslinked polymeric composition or filler-reinforced composite preferably exhibits at least equivalent or improved physical properties, such as fracture stress, strain, and/or flexural strength.

Examples have been set forth below for the purpose of illustration and to describe certain specific embodiments of the invention. However, the scope of this invention is not to be in any way limited by the examples set forth herein.

EXAMPLES

Overview

An ideal vitrimer for industrial applications needs the characteristics of (1) high mechanical strength, (2) facile processability (e.g., low temperature and short annealing time), and (3) mechanical or chemical recyclability. However, few reported vitrimers can meet all these characteristics. Therefore, new strategies are needed to tailor malleable thermosets to maintain their robust mechanical properties while simultaneously promoting reprocessability to realize their potential application in high-performance carbon-fiber-reinforced-polymers (CFRPs).

Herein is described a simple design of dynamic polyurea/epoxy (DPE) vitrimers and CFRPs with exchangeable disulfide crosslinks, that overcome many of the intrinsic limitations of the conventional art. Compared to conventional epoxy vitrimers, the DPE vitrimer exhibits six times faster bond rearrangement and ~40° C. lower reprocessing temperature, which permits full recovery of the mechanical strength throughout six reprocessing cycles, while the conventional vitrimer lost ~63% of strength. Moreover, the CFRPs prepared with the DPE vitrimers exhibit facile multi-cycle processability and repairability by thermoformation. FIG. 1A shows a conventional epoxy based on permanently crosslinked networks that cannot be reprocessed or recycled after cure. FIG. 1B shows a dynamic epoxy (DE) containing dynamic covalent bonds as part of the crosslinked network that can be reprocessed or recycled only at high temperatures and a long annealing time (lacks repeated recyclability). FIG. 1C shows a dynamic polyurea/epoxy (DPE) with exchangeable bonds that has a controllable network reconfiguration and possesses a relatively low glass transition temperature. After curing, the DPE can be reprocessed or recycled (at least six times) at moderate temperature and short annealing time.

Figures 2A, 2B, 2C, 2D, 2E:
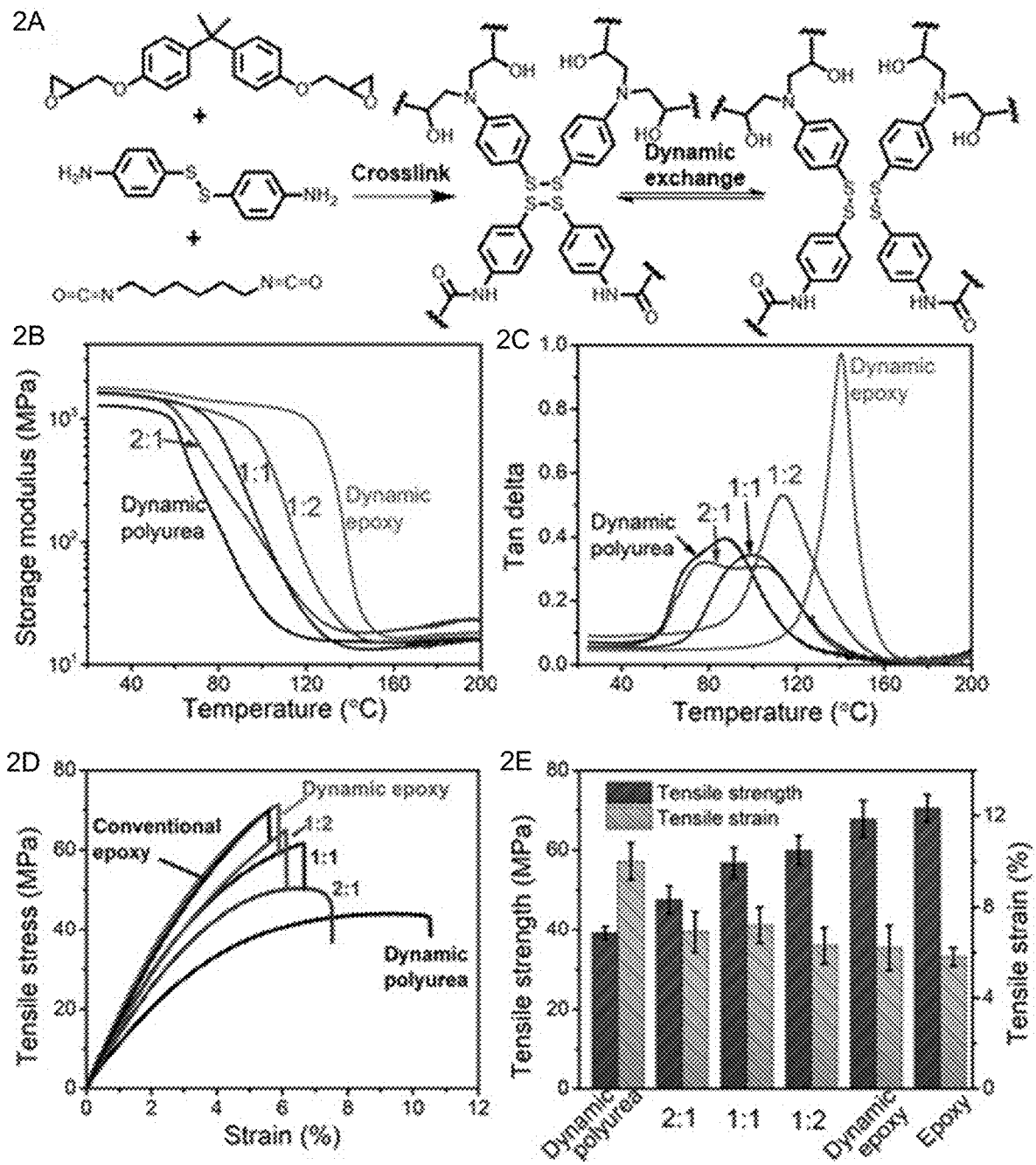
FIGS. 2A-2E. Synthesis and thermo-mechanical properties of DE and DPE.

More specifically, a solution is provided for multi-cycle recyclability of robust dynamic CFRPs without deterioration of performance (FIG. 1C), which overcomes the limitation of various vitrimer systems. The strategy involves the incorporation of dynamic metathesis of aromatic disulfide bonds bridging between ductile polyurea segments and mechanically robust epoxy networks (FIG. 2A). The dynamic polyurea/epoxy (DPE) vitrimers were synthesized by reacting tailored ratios of aliphatic polyisocyanate (hexamethylene diisocyanate (HDI) prepolymer) and diglycidyl ether of bisphenol A (DGEBA) using 4-aminophenyl disulfide (AFD) as dynamic crosslinks (FIG. 2A).

The ductile polyurea not only improved the mechanical properties (e.g. toughness, resilience, ductility) but also decreased the processing temperature, which thus, ultimately improved recyclability. Their thermal, mechanical, and rheological properties were investigated and compared with conventional epoxy thermosets and a dynamic epoxy (DE) vitrimer control. Because of the rapid exchange reactions and the efficient polyurea/epoxy chain rearrangement, the DPE resins exhibited superior reprocessability with a rapid processing rate and excellent recovery of mechanical strength compared to the DE control. Furthermore, the DPE resins and their CFRPs displayed outstanding mechanical and chemical recyclability. These advanced properties highlight the great promise of these compositions for providing mechanically robust, chemically and mechanically recyclable, rapidly processable CFRPs.

Chemicals and Materials 4-aminophenyl disulfide (AFD, 98%) and 4,4'-diaminodiphenylmethane (DAPM) were commercially obtained and used as dynamic and conventional crosslinkers, respectively. Unsized PAN-based unidirectional carbon fiber (HexTow IM7, unsized) was commercially obtained. This fiber has 12,000 (12 k) filament count tows. Carbon fiber fabric plain wave (Hexcel IM7, 6 k tows) was commercially obtained. Diglycidyl ether of bisphenol A (DGEBA, Araldite LY1564, 1200-1400 mPa·s) was commercially obtained. Aliphatic polyisocyanate based on hexamethylene diisocyanate (HDI prepolymer, 450 mPa·s, wherein the product includes a small fraction (0.26%) of monomeric HDIs was commercially obtained. Chemicals used in the synthesis were commercially available and were used as received without further purification.

Synthesis of DE and Conventional Epoxy

The DE resin was first prepared by mixing AFD and DGEBA with a mole ratio of 1:1.7 at 80° C. and stirred for ~15 min. The AFD/DGEBA mixture solution went through ultrasonic degassing for 30 min at room temperature to remove dissolved gases during the mixing process. After degassing, the mixture was poured into a dogbone-type PTFE mold and cured in an oven at 120° C. for 2.5 hours. Similar to the synthesis of dynamic epoxy, the conventional epoxy was prepared by mixing DAPM and DGEBA, followed by the same conditions.

Synthesis of Dynamic Polyurea

THF was first used as a solvent to dissolve AFD powder at room temperature. THF can slow the crosslinking reaction between AFD and HDI prepolymer. The HDI prepolymer was then added to the AFD/THF solution with a mole ratio of 1:1 for HDI prepolymer and AFD. After being mixed for 10 min and followed by ultrasonic degassing for 5 min at room temperature, the AFD/HDI solution was then poured into a PTFE mold and placed in a hood at room temperature for 2 days to evaporate the solvent. During the solvent evaporation, HDI prepolymer was simultaneously cured. For comparison of the samples cured at room temperature, another batch of the dynamic polyurea samples was prepared, which were cured in an oven at 120° C. for 2.5 hours.

Synthesis of a Dynamic Polyurea-Epoxy Polymer

A tailored resin combination of epoxy and urea resins was studied in this work. Three different weight ratios of HDI prepolymer to epoxy resins were fixed as 2:1, 1:1, and 1:2. Same as the preparation of the dynamic polyurea resin, AFD was first dissolved in THF. The epoxy and urea resins were mixed together and then added to the prepared AFD/THF solution. After stirring for 10 min and ultrasonic degassing for 5 min at room temperature, respectively, the epoxy/HDI with AFD solution was then poured into a PTFE mold and placed in a hood at room temperature for two days to remove the solvent. After solvent evaporation, the casted dogbone-type samples were placed in an oven and cured at 120° C. for 2.5 hours.

Fabrication of Carbon Fiber-Reinforced Polymers (CFRPs) with Unidirectional Carbon Fibers A custom compression mold was used for the fabrication of CFRPs with unidirectional carbon fibers. First, unidirectional carbon fiber tows were placed in the mold in the presence of a mixture of resin and crosslinker. Three different CFRPs were fabricated based on conventional epoxy, dynamic epoxy, and dynamic polyurea-epoxy, respectively. The curing process was then conducted at 120° C. for 2.5 hours. As estimated, the carbon fibers have a volume fraction of ~64% in the composite matrix.

Fabrication of Multilayered Composites with Plain Weave Carbon Fiber Fabric

Three 120×120 mm sheets of carbon fiber fabric plain weave were first soaked in a prepared dynamic epoxy-polyurea resin solution with THF as a solvent for 30 min. The sheets were then taken out, dried at room temperature within a hood, and followed dried in a vacuum oven for 24 hours. Once the solvent was fully evaporated, the composites were cured at 120° C. for 2.5 hours. After being cured, all these composite layers were placed together and pressed in a hot press. After cooling to room temperature, a compact multilayered composite sheet was obtained.

Reprocessing and Reshaping of The Composite Sheets

The composite sheet was compression molded in a fast-acting compression molding press (100-ton capacity) using the closed cavity additively manufactured (AM) mold (A. A. Hassen et al., *Addit. Manuf,* 32, 101093, 2020). The mold size (i.e. each half) was 30 cm×30 cm×8 cm in width, length, and thickness, respectively. The composite sheets were heated to 160° C. using the press-heated platens. Then a maximum pressure of 1 MPa (145 psi) was used and a dwell time of 10 minutes was set before the part was cooled down and demolded.

Synthesis of DPE Vitrimers

The DPE vitrimers were prepared by the reaction of diglycidyl ether of bisphenol A (DGEBA) and hexamethylene diisocyanate (HDI) aliphatic polyisocyanate prepolymer with disulfide-based dynamic crosslinker 4-aminophenyl disulfide (AFD) (FIG. 2A). To investigate the impact of polyurea, different weight ratios of polyurea to epoxy resins at 1:0, 2:1, 1:1, 1:2, and 0:1 were synthesized. Three reference samples, including conventional epoxy, dynamic polyurea (i.e. 1:0), and DE (i.e. 0:1) networks, were prepared. The conventional epoxy was obtained via mixing DGEBA and 4,4'-diaminodiphenylmethane (DAPM), while the DE network was prepared by mixing DGEBA with AFD, followed by an ultrasonic degassing procedure. Both conventional and DE resins were cured in the same condition in an oven at 120° C. for 2.5 hours (A. Ruiz de Luzuriaga et al., *Mater. Horiz.*, 3, 241-247. 10.1039/C6MH00029K, 2016). For DPE vitrimers, THF was used to dissolve AFD and then mixed HDI prepolymer or HDI/epoxy resins. After solvent evaporation, both HDI and HDI/epoxy resins were cured at the same conditions as epoxy resins (120° C. for 2.5 hours). FTIR spectroscopy confirmed the formation of DPE vitrimers as observed in the amine-epoxy bond at ~1580 cm$^{-1}$ and urea peak at ~1680 cm$^{-1}$, respectively.

Thermal and Mechanical Properties of Vitrimers

The thermomechanical properties as a function of different weight ratios of dynamic polyurea to epoxy resins were investigated by the typical temperature sweeps of dynamic mechanical analysis (DMA) to record their storage modulus (E') and loss factor (tan δ) values (FIGS. 2B and 2C). As shown in FIG. 2B, the storage modulus of DPE sample with lower epoxy content starts to decrease at lower temperature and turns into a constant rubbery plateau. The presence of constant storage moduli at their rubbery plateau state in all of the samples confirms the cross-linked nature of dynamic covalent networks. The glass transition temperature ($T_g$) was determined from the maximum of the tan δ. As shown in FIG. 2C, the dynamic polyurea shows a $T_g$ at −88° C. while the DE has a $T_g$ at −140° C., which is in agreement with previous reports (e.g., A. Ruiz de Luzuriaga et al., Ibid.). The DPE network exhibited a clear trend of decreasing $T_g$ with an increasing concentration of polyurea. For example, $T_g$ of DPE resin is −100° C. at a weight ratio of 1:1, which is much lower than that of the DE at ~140° C. The broadening of the glass transition temperature seen in dynamic PU and PU-dominant DPE (2:1) may be attributed to the monomeric HDI included in the polyisocyanates. This resulted in heterogeneity in the molecular weights upon the reaction with disulfide amines (and epoxides in DPE 2:1) followed by the dynamic exchange. Moreover, the DE and DPE vitrimers exhibited the topology freezing temperatures ($T_v$) (i.e., the hypothetical temperature above which the dynamic exchange occurs in vitrimers) below their respective $T_g$. Thus, the dynamic exchange of disulfide bonds in both vitrimers should readily occur in the temperatures above $T_g$ (as tested).

To examine the mechanical properties of the dynamic resins, dumbbell-shaped specimens were first fabricated using a liquid solution-based method, and they were cured n an oven to obtain fully crosslinked dynamic networks. As shown in FIG. 2D, the uniaxial tensile strength of samples increased with more loading of epoxy. In contrast, the fracture tensile strain (ductility) exhibited the opposite trend. Both the tensile strength and strain values of samples are summarized in FIG. 2E. For example, the tensile strength of the dynamic polyurea was found to be 39.2±1.7 MPa, while that of the DPE network with a weight ratio of 1:1 increased to 56.8±3.8 MPa. The DE exhibited a tensile strength of 67.8±4.6 MPa, which is similar to the tensile strength of conventional epoxy. Considering desirable strength, ductility, and $T_g$ value for processing, the DPE network with 1:1 was found to be a well-balanced vitrimer, and for this reason was used as starting point.

Dynamic Properties

All samples exhibited a rubbery plateau storage modulus at a temperature higher than $T_g$, indicating the crosslink density was preserved, which is a behavior often observed for thermosets and vitrimer materials. Because of the exchangeable dynamic crosslinks, the stress from the deformation of vitrimers can be easily released at a high enough temperature above their $T_v$ and $T_g$ in contrast to the permanent network. The exchange reaction of dynamic crosslinks is temperature-dependent and accelerates upon heating.

Figures 3A, 3B, 3C, 3D, 3E, 3F, 3G:
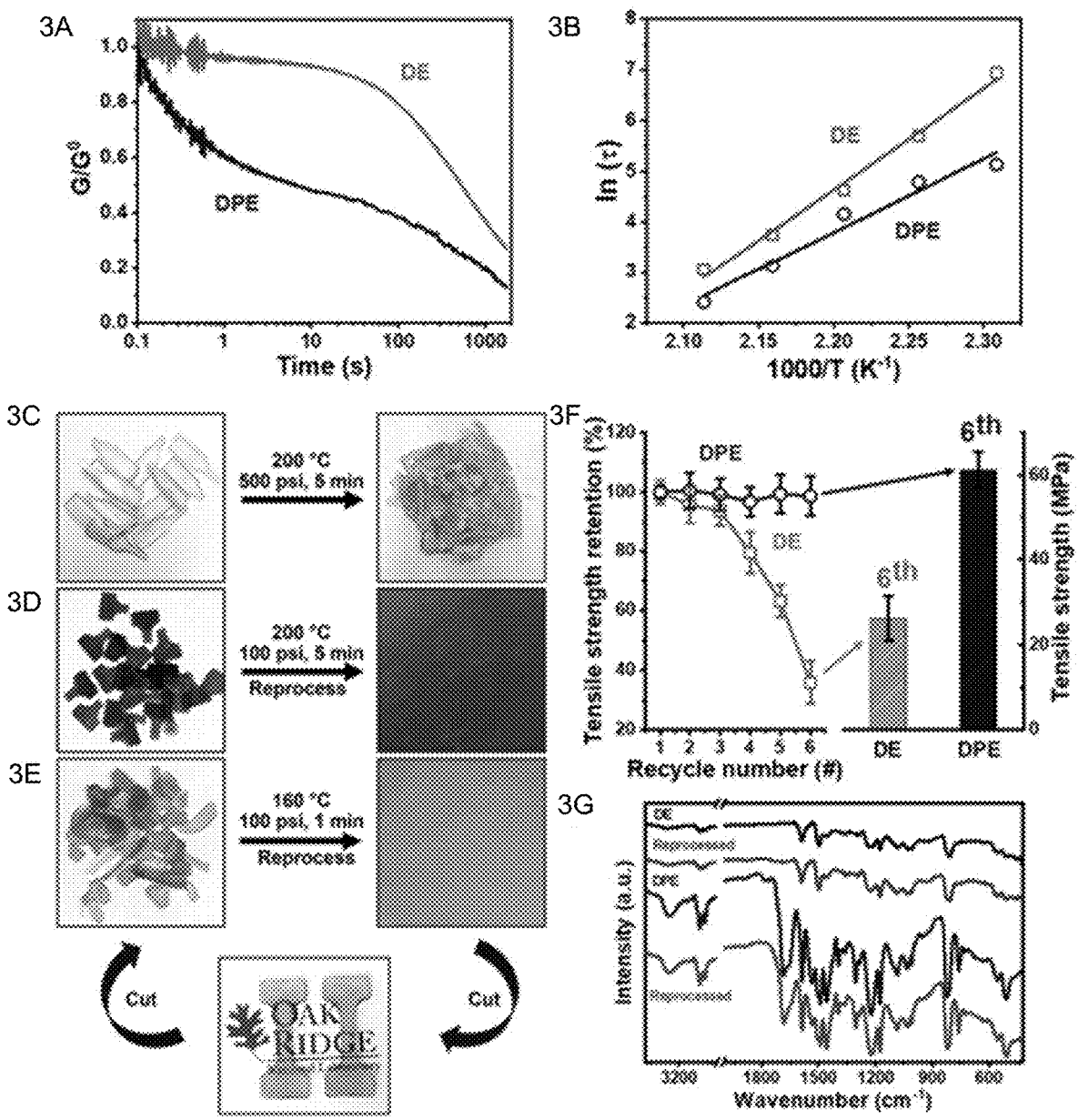
FIGS. 3A-3G. Reprocessing by hot pressing.

To study the exchange reaction of the dynamic polyurea-epoxy vitrimers, a rheometer was used to characterize their stress relaxation behavior. The DE vitrimers with exchangeable disulfide bonds have been characterized by a stress relaxation behavior, as well known. In the present study, the stress relaxation measurements for both the DE and the DPE (1:1) samples were performed at five different temperatures, including 160, 170, 180, 190 and 200° C. at 1% strain. All of these temperatures were set at least 20° C. higher than their $T_g$, in which both samples were able to completely stress relax and flow. The stress relaxation time was estimated as the time required to relax 63% of the initial stress. FIG. 3A shows the typical stress relaxation curves at a temperature of 160° C.

For the present DPE network, the relaxation time (τ), defined as the time required to reach $G/G^0=1/e$, at 160° C. is 170 seconds, which is six times faster than that of the DE of 1,032 seconds. This indicates that the DPE clearly undergoes exchange kinetics significantly faster than the DE. At a high temperature of 200° C., the obtained relaxation time of the DPE resin decreased to 11 seconds, which is two-fold faster compared to the 21 seconds of the DE and the reported time of 20 seconds for the epoxy system (e.g., A. Ruiz de Luzuriaga et al., Ibid.). The relaxation times of DE and DPE networks follow the Arrhenius' law, $\tau(T)=\tau_0 \exp(R_a/RT)$, as shown in FIG. 3B. From this equation, an apparent activation energy ($E_a$) of DPE resin was estimated as 120 kJ/mol, which is ~30% lower than that of the DE at 166 kJ/mol. In addition, the $T_v$ of the DPE vitrimer was calculated to be 87° C., which is ~30° C. lower than that estimated for DE vitrimer, 115° C. Although these $T_v$ of both vitrimers cannot be practically observed due to being consistently below their respective $T_g$, such lower $E_a$ and $T_v$ of DPE suggest energetically more favorable dynamic exchange of disulfide crosslinks by the inclusion of more mobile, softer polyurea backbones. The low $E_a$ value also suggests that the DPE resin more readily reaches the critical rate of exchange reactions and permits faster rearrangement of polymer chains. The favorable reaction kinetics of DPE is attributed to the introduction of the flexible polyurea chain to the system, which facilitates chain mobility for bond exchange to occur kinetically faster in the DPE system. Therefore, the DPE resin is more likely to be reprocessable at a moderate temperature with a short annealing/processing time.

Reprocessing

Facile reprocessability represented by low reprocessing temperature and short annealing time is crucial for vitrimers to be deployed in industrial applications. To illustrate the superior reprocessability of the present dynamic vitrimers, the traditional epoxy crosslinked with unexchangeable covalent bonds (FIG. 3C) was compared with the DE and DPE vitrimers having dynamic covalent crosslinks (FIGS. 3D and 3E). Due to the permanently crosslinked networks, the broken scraps of traditional epoxy specimens could not be reprocessed or recycled using hot-pressing at elevated temperatures of 200° C., and they remained broken after hot pressing (FIG. 3C). In contrast, owing to the exchangeable disulfide bonds, both DE and DPE scraps were successfully hot-pressed and reformed into homogenous, compact films (FIGS. 3D and 3E). Significantly, the reprocessing of the DPE could be performed at a moderate temperature of 160° C., coupled with a short annealing time of 1 minute. This reprocessing condition of DPE vitrimers proves a significant enhancement in energy-efficiency and deployability, compared to that of the DE, which required a 40° C. higher reprocessing temperature of 200° C. and five times longer annealing time of 5 minutes. Such facile reprocessability of the DPE demonstrates a promising adoption of more sustainable, circular manufacturing and advanced composite fabrication. In addition to the good high-temperature processability of the DPE featured by the excellent film formability (FIG. 3E), it was also noted that the DPE was superior in handling at room temperature, as indicated by its greater flexibility and ductility (FIGS. 2D and 2E), compared with the DE, which often exhibited brittle fracture upon shaping into dumbbell-shaped specimens.

The effectiveness on the recyclability of DPE and DE was evaluated by testing their mechanical properties after each reprocessing cycle. The reprocessing of the DE was conducted at 200° C. and 100 psi for 5 min (FIG. 3D), while the DPE was reprocessed at 160° C. and 100 psi for 1 min. As shown in FIG. 3E, the broken pieces were successfully remolded into compact films and then cut into dumbbell-shaped specimens. The tensile behavior of both DE and DPE samples was evaluated after each of the six recycling cycles (FIG. 3F). The results demonstrate that both DE and DPE can recover their tensile strength. The tensile strength of the DE started to decrease from the $2^{nd}$ reprocessing and dramatically dropped after the $6^{th}$ reprocessing to ~26 MPa, which is only ~36% of the initial tensile strength (FIG. 3F). This significant loss of tensile strength may be due to the degradation of disulfide bonds and oxidation of the epoxy network upon repeated exposure to the high processing temperature of 200° C. (FIG. 3F). In contrast, the DPE maintained nearly 100% of the mechanical strength, ~61 MPa after the $6^{th}$ reprocessing cycle, suggesting that the DPE was readily reprocessed multiple times at 160° C. without any considerable degradation.

The FTIR spectra confirmed the stability of DPE resin (FIG. 3G) as there is no obvious change observed in the disulfide bond (~450-650 $cm^{-1}$ for S—S bond stretching) owing to the moderate temperature and short annealing time. The rapid exchange reactions and the efficient polyurea/epoxy chain rearrangement thus permit the highly efficient reprocessing of the DPE at a moderate temperature with a short annealing time. Stable multi-cycle reprocessability is crucial for practical deployment since multi-processes, such as remodeling, are necessary for the thermoformation of composites as well as repeated mechanical recycling. It was also noted that the DPE system showed better creep resistance than DE, attributed to the enhanced bond recovery of DPE in the secondary creep region, although the underlying mechanism would require more investigation.

Reprocessability of CFRPs

Figures 4A, 4B, 4C, 4D, 4E:
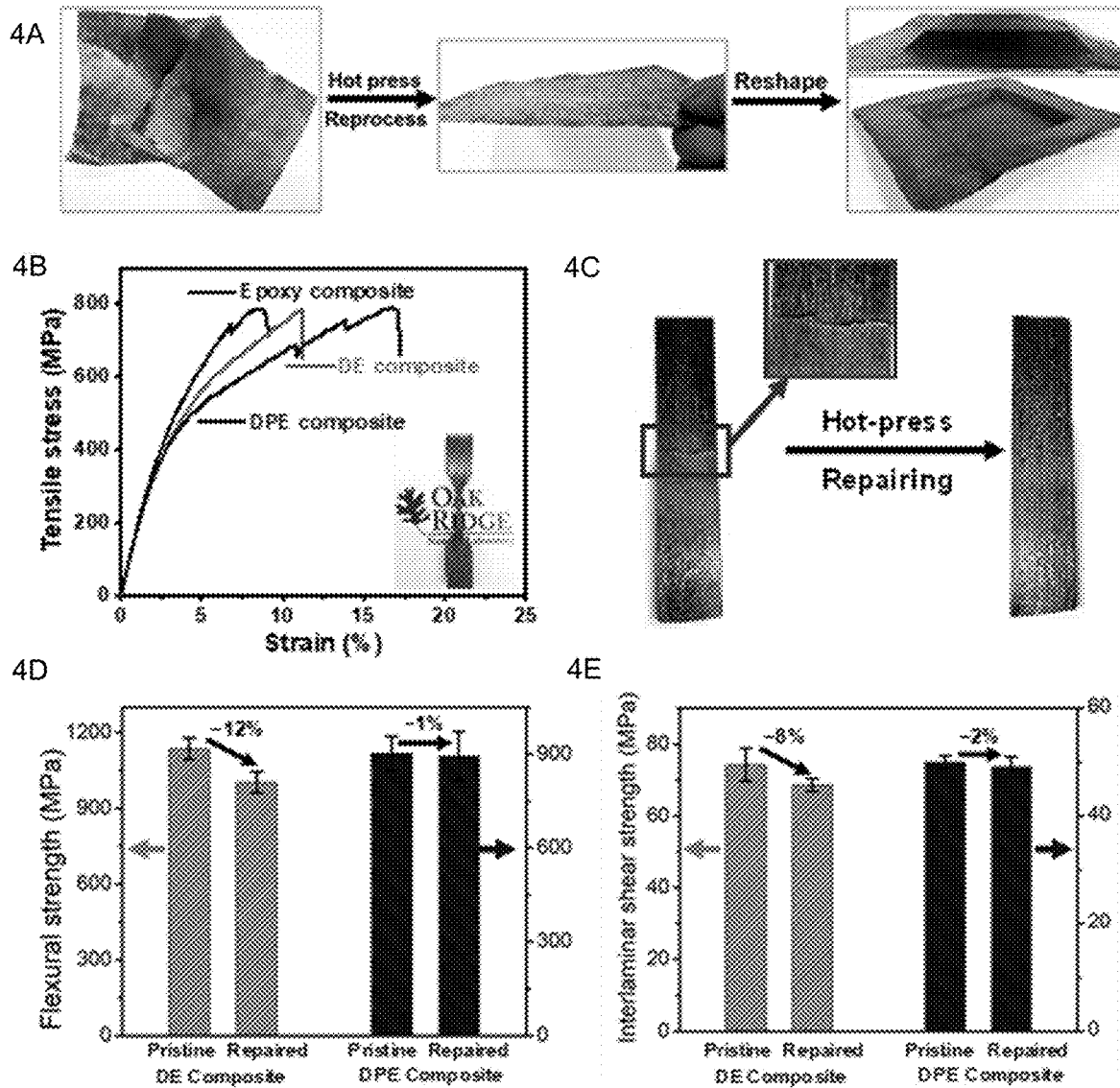
FIGS. 4A-4E. Thermoformation of cured composite laminate and mechanical properties of the unidirectional carbon fiber-reinforced polymers (CFRPs).

The facile processability of the DPE is well suited for (re)processing and fabrication of CFRPs. A conventional thermoforming of cured composite CFRP laminate was followed (FIG. 4A). First, three individual carbon fiber woven fabric composites with a dimension of 120×120 mm were soaked in a DPE resin solution and cured in an oven at 120° C. for 2.5 hours (FIG. 4A). After curing, the three composite sheets were placed together and pressed in a hot press. After hot pressing at 160° C. and 500 psi for 1 min, these three sheets were formed into a compact multilayer composite laminate (FIG. 4A), which further demonstrates the excellent processability of the DPE. The multilayered composite laminate was then placed inside a closed cavity compression mold to quickly obtain a reshaped 3D composite (FIG. 4A). Such a fast-thermoforming process illustrates the great promise of the DPE for scalable, low-cost manufacturing of CFRPs.

Uniaxial tensile tests were performed on conventional epoxy, DE, and DPE composites with unidirectional carbon fibers (Hexcel IM7, 12K) according to ASTM D638. FIG. 4B shows the representative tensile stress-strain curves. The tensile strength of the DPE composite was found to be comparable to those of the DE and conventional epoxy composites, exhibiting a high tensile strength of ~800 MPa. Notably, the fracture strain of the DPE composite is over two times larger than that of conventional epoxy composites, thus demonstrating much higher toughness. The flexural strength of the CFRPs was performed in a three-point bending mode in accordance with ASTM D7264. The maximum of the flexural strength (FS) was estimated using the following equation:

$$\sigma_{FS} = 1.5 \times \frac{P_{max} \times L}{b \times h^2}$$

where L is the support span of 44.8 mm. The flexural strength of the DPE composite reached 903±53.6 MPa, which represents ~80% of the flexural strength of the DE and conventional epoxy composites. To assess repairability, a DPE composite sample was used in which a crack formed in the matrix after the flexural test (FIG. 4C). This crack was fully repaired after being hot-pressed at 160° C. for 5 min in a compression mold, as shown in FIG. 4C. From the flexural stress-crosshead displacement curves, both fracture stress and strain of the repaired DPE composite are very close to those of pristine ones. Notably, the repaired DPE composite retained nearly 100% of the flexural strength of the pristine sample, whereas the repaired DE composite dropped about 12% of the flexural strength of the original sample (FIG. 4D). These results demonstrate that structural damage experienced by DPE composites can be fully repaired under moderate processing conditions in contrast to the DE composite.

In addition, a short-beam shear test method following ASTM D2344 was used to characterize the apparent interlaminar shear strength of CFRPs, and representative shear stress-crosshead displacement curves were generated. The maximum interlaminar shear strength (ILSS) can be calculated using the equation as follows:

$$F_{ILSS} = 0.75 \times \frac{P_{max}}{b \times h}$$

where $P_{max}$ is the maximum load measured during the test, b is the specimen width, and h is the specimen thickness. The interlaminar shear strengths are summarized in FIG. 4E. The DPE composite exhibits a sufficient interlaminar shear strength of 50±1.2 MPa, which is ~67% of that of the DE composite. More importantly, the shear stress-strain curve of the DE composite exhibited a gradual decrease after a critical stress state due to the interlaminar damage evolution, while the DPE composite barely changed. This result indicates a more ductile behavior of the DPE than that of the DE, which can be correlated to the efficient DPE chain rearrangement in the composite matrix. Such improved ductile behavior is expected to dramatically enhance the interlaminar fracture toughness of the CFRPs. Furthermore, the repaired DPE composite exhibited only less than ~2% loss in the interlaminar shear strength of the original sample, which is four times smaller than the ~8% drop in the DE composite. Even after six cycles of repairing, the repaired DPE CFRP retained approximately 97% interlaminar shear strength, whereas the DE CFRP lost almost 28% of initial interlaminar shear strength. The mechanical property and repairability demonstrated herein indicate the great potential of a tailored resin combination of DPE composite to design and prepare mechanically robust, readily reprocessable CFRPs.

Chemical Resistance Study and Fiber Recycling

Another intriguing feature of these vitrimers and CFRPs is their chemical resistance ability. Similar to the conventional crosslinked resins, the DPE vitrimers exhibited good solvent resistance in common organic solvents, such as ethanol, acetone, THF, toluene, and chloroform, even after five hours of sonication. While the DPE vitrimers exhibit very good solvent resistance, they can be intentionally dissolved in binary solvents with the presence of an excess thiol group, including 1-dodecanethiol (DDT), or 3-mercaptopropionic acid (3-MPA), due to the thiol-disulfide exchange reaction with the crosslinked disulfides. For example, three different binary solvents with a volume ratio of 1:1 were prepared, including DDT/DMAc, 3-MPA/DMAc, and DDT/DMF. All of the binary solvents exhibited a full dissolution of the DPE resins. This result agrees well with the reported studies that the thermosetting polymers containing dynamic disulfide bonds can be fully dissolved in a thiol-containing solvent (e.g., A. Ruiz de Luzuriaga et al., Ibid.). To examine the chemical recycling of CFRPs, the chemical recyclability of a DPE composite sheet in DDT/DMF was further assessed. The CFRP was first immersed in the binary solvent at room temperature, then magnetically stirred. It was observed that the DPE matrix was fully dissolved after 24 hours, and the carbon fibers were successfully recovered and reclaimed. The recovered carbon fiber fabric was used to fabricate CFRP using DPE matrix. The recycled CFRP preserved almost similar mechanical performance as observed in the tensile test. The chemical recycling of the DPE composites shown here, therefore, offers an effective approach to recovering fibers as needed and provides another path to achieve the circularity of CFRPs.

Discussion

The tailored resin system with exchangeable disulfide bonds, described herein, permitted the resulting CFRPs to overcome two long-lasting challenges: simultaneously achieving high mechanical strength and facile multi-cycle reprocessability. The DPE vitrimer exhibited a six-times faster stress relaxation time at 160° C. compared to the dynamic epoxy. This resulted at least in part from the synergy of the rapid exchange reaction of disulfide metathesis and the efficient polyurea/epoxy chain rearrangement. Significantly, the DPE vitrimer retained the mechanical strength after many processing cycles by virtue of its facile moldability at a moderate temperature with a short annealing time, in contrast to the dramatic decrease in the mechanical strength observed from DE after four cycles.

Notably, the CFRPs with the DPE exhibited excellent reprocessability and repairability with near-complete preservation of mechanical strength. The DPE resins and their CFRPs also displayed chemical recyclability where carbon fibers could be recycled while maintaining good chemical resistance to the common solvents. These findings thereby provide a solution to the fundamental challenges of high energy/carbon-intensiveness and mechanical deterioration upon recycling of thermoset composites. Furthermore, the formulation of DPE was intentionally designed to be simple, so that facile scale-up and rapid adoption in the industry are possible. The stable multi-cycle recyclability of the DPE composites and their design principle can promote the development of highly sustainable, efficient and low-carbon manufacturing of next-generation CFRPs, which can be widely adopted in lightweight materials for applications in various clean energy technologies.

Alternative Embodiments

In the experiments described above, diglycidyl ether of bisphenol A (DGEBA) epoxy, hexamethylene diisocyanate (HDI) aliphatic polyisocyanate prepolymer, and disulfide based dynamic crosslinker 4-aminophenyl disulfide (AFD) were used. However, different types of di-, tri-, tetra- and multi functional epoxies including 4,4'-methylenebis (n,n-diglycidylaniline), tris(4-hydroxyphenyl)methane triglycidyl ether, N,N-diglycidyl-4-glycidyloxyaniline, trimethylolpropane triglycidyl ether, poly[(phenyl glycidyl ether)-co-formaldehyde], resorcinol diglycidyl ether and others can be used instead of DGEBA. Similarly, various kinds of di-, tri-, tetra- and multi-functional isocyanate monomers and prepolymers can be utilized. The examples include but are not limited to aliphatic, aromatic isocyanate (e. g. 4,4'-methylenebis(phenyl isocyanate)), linear, branched (e.g., isophorone diisocyanate, and poly(hexamethylene diisocyanate)) and different molecular weight isocyanate prepolymers, such as poly(propylene glycol) diisocyanate, (hydrogenated) polybutadiene diisocyanate, and many others. Instead of the 4-aminophenyl disulfide crosslinker, 2-aminophenyl disulfide, 3,3'-dithiodipropionic acid, cystamine dihydrochloride, 2-hydroxyethyl disulfide, 6,6'-dithiodinicotinic acid and various other disulfide compounds with reactive end groups can be utilized as a disulfide-based crosslinker.

To further enhance the mechanical properties including fiber matrix interfacial adhesion of CFRPs, carbon fiber can be functionalized by dynamic functional groups, such as thiol (—SH), amine (—$NH_2$), carboxylic acid (—COOH), epoxide, and hydroxy (—OH) groups. The functionalized fiber can directly form dynamic covalent bonds with the vitrimer matrix that will not only improve the mechanical properties but also improve the reprocessability of the CFRPs.

While there have been shown and described what are at present considered the preferred embodiments of the invention, those skilled in the art may make various changes and modifications which remain within the scope of the invention defined by the appended claims.

What is claimed is:

1. A crosslinked polymeric composition comprising A, B, C, D, and E units, defined as follows:

A units:

wherein G is a hydrocarbon linker;

B units:

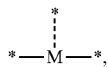

wherein M is a hydrocarbon linker;

C units:

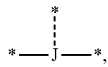

wherein J is a linkage resulting from reaction between an epoxy group and a group reactive with an epoxy group;

D units:

wherein K is a linkage resulting from reaction between an isocyanate group and a group reactive with an isocyanate group; and E units:

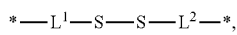

wherein $L^1$ and $L^2$ are independently hydrocarbon linkers;

wherein:

dashed bonds represent optional bonds;

the asterisks (*) in C units represent covalent bond connection points with asterisks in A units and E units;

the asterisks (*) in D units represent covalent bond connection points with asterisks in B units and E units;

wherein a portion of E units are bound to C units, a portion of E units are bound to D units, and a portion of E units are bound to both C and D units; and the composition contains a multiplicity of A units, multiplicity of B units, multiplicity of C units, multiplicity of D units, and multiplicity of E units.

2. The composition of claim 1, wherein J is a linkage resulting from reaction between an epoxy group and a group reactive with an epoxy group, wherein the group reactive with an epoxy group is selected from an amino, hydroxy, or carboxylic acid group.

3. The composition of claim 2, wherein C units have the following structure:

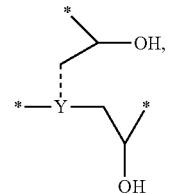

wherein Y is selected from

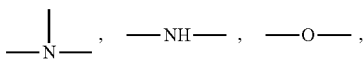

and C(O)O—; and the dashed bond represents an optional bond that can only be present when Y is

4. The composition of claim 1, wherein K is a linkage resulting from reaction between an isocyanate group and a group reactive with an isocyanate group, wherein the group reactive with an isocyanate group is selected from an amino, hydroxy, or carboxylic acid group.

5. The composition of claim 4, wherein D units have the following structure:

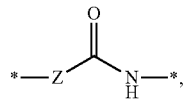

wherein Z is —NH—, —O—, or a bond.

6. The composition of claim 1, wherein G (in A units) contains at least one aromatic ring.

7. The composition of claim 1, wherein G (in A units) contains at least two aromatic rings interconnected by an alkylene linkage.

8. The composition of claim 1, wherein A units comprise the following structure:

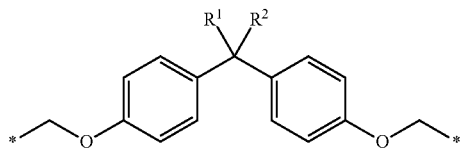

wherein $R^1$ and $R^2$ are independently selected from H and $CH_3$ groups.

9. The composition of claim 1, wherein M (in B units) is an alkylene linker of the formula $-(CH_2)_n-$, wherein n is an integer in a range of 1-12.

10. The composition of claim 1, wherein M (in B units) is an alkylene linker of the formula $-(CH_2)_n-$, wherein n is an integer in a range of 3-12.

11. The composition of claim 1, wherein M (in B units) contains at least one aromatic ring.

12. The composition of claim 1, wherein the crosslinked polymeric composition further comprises a solid filler material homogeneously distributed throughout the crosslinked polymeric composition.

13. The composition of claim 12, wherein the solid filler material is selected from carbon particles, glass particles, basalt particles, cellulose particles, and metallic particles.

14. The composition of claim 12, wherein the solid filler material comprises carbon particles.

15. A method for producing the crosslinked polymeric composition of claim 1, the method comprising reacting the following components:

A molecules:

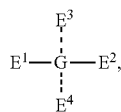

wherein G is a hydrocarbon linkage connected to at least $E^1$ and $E^2$ and optionally to one or both of $E^3$ and $E^4$, if present, wherein $E^1$, $E^2$, $E^3$, and $E^4$ are epoxy groups;

B molecules:

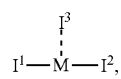

wherein M is a hydrocarbon linkage connected to at least $I^1$ and $I^2$ and optionally $I^3$, if present, wherein $I^1$, $I^2$ and $I^3$ represent isocyanate groups;

C molecules:

wherein $L^1$ and $L^2$ are independently hydrocarbon linkers, and $V^1$ and $V^2$ are independently functional groups reactive with epoxy groups ($E^1$, $E^2$, $E^3$, and $E^4$ groups) and isocyanate groups ($I^1$, $I^2$, and $I^3$ groups);

wherein:

dashed bonds represent optional bonds;

$V^1$ and $V^2$ react with $E^1$ and $E^2$, and optionally $E^3$ and/or $E^4$, if present, to produce first linking units having the formula:

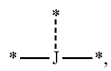

wherein J is a linkage resulting from reaction between an epoxy group, selected from $E^1$, $E^2$, $E^3$, and $E^4$ groups, and a group reactive with an epoxy group, selected from $V^1$ and $V^2$ groups, to result in said first linking units covalently bonding between G hydrocarbon linkages of A molecules and $L^1$ and $L^2$ of C molecules; and $V^1$ and $V^2$ react with $I^1$ and $I^2$, and optionally $I^3$, if present, to produce second linking units having the formula:

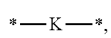

wherein K is a linkage resulting from reaction between an isocyanate group, selected from $I^1$, $I^2$, and $I^3$ groups, and a group reactive with an isocyanate group, selected from $V^1$ and $V^2$ groups, to result in said second linking units covalently bonding between M hydrocarbon linkages of B molecules and $L^1$ and $L^2$ of C molecules.

16. The method of claim 15, wherein G (in A molecules) contains at least one aromatic ring.

17. The method of claim 15, wherein G (in A molecules) contains at least two aromatic rings interconnected by an alkylene linkage.

18. The method of claim 15, wherein A molecules have the following structure:

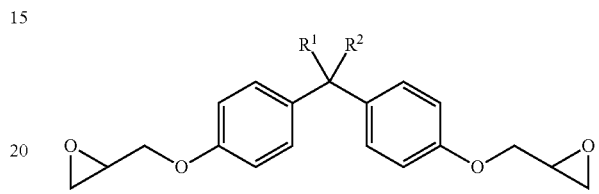

wherein $R^1$ and $R^2$ are independently selected from H and $CH_3$ groups.

19. The method of claim 15, wherein M (in B molecules) is an alkylene linker of the formula $-(CH_2)_n-$, wherein n is an integer in a range of 1-12.

20. The method of claim 15, wherein M (in B molecules) is an alkylene linker of the formula $-(CH_2)_n-$, wherein n is an integer in a range of 3-12.

21. The method of claim 15, wherein B molecules have the following structure:

wherein m is an integer in a range of 0-10.

22. The method of claim 15, wherein M (in B molecules) contains at least one aromatic ring.

23. The method of claim 15, wherein $V^1$ and $V^2$ are selected from the group consisting of amino, hydroxy, and carboxylic acid groups.

24. The method of claim 15, wherein $V^1$ and $V^2$ are selected from amino and hydroxy groups.

25. The method of claim 15, wherein the first linking units have the structure:

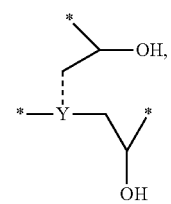

wherein Y is selected from

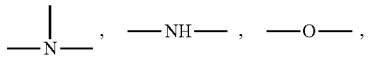

and $-C(O)O-$; and the dashed bond represents an optional bond that can only be present when Y is

26. The method of claim 15, wherein the second linking units have the structure:
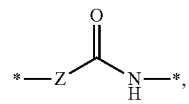
wherein Z is —NH—, —O—, or a bond.
* * * * *